(12) United States Patent
Jang et al.

(10) Patent No.: US 12,404,621 B2
(45) Date of Patent: Sep. 2, 2025

(54) MOTOR FOR WASHING MACHINE

(71) Applicant: New Motech Co., Ltd., Gwangju (KR)

(72) Inventors: Jeong Cheol Jang, Gwangju (KR);
Gyeong Sik Yang, Gwangju (KR);
Seung Ju Park, Gwangju (KR)

(73) Assignee: New Motech Co., Ltd., Gwangju (KR)

( * ) Notice: Subject to any disclaimer, the term of this patent is extended or adjusted under 35 U.S.C. 154(b) by 205 days.

(21) Appl. No.: 18/204,359

(22) Filed: May 31, 2023

(65) Prior Publication Data

US 2023/0412033 A1 Dec. 21, 2023

(30) Foreign Application Priority Data

Jun. 20, 2022 (KR) ......................... 10-2022-0074601

(51) Int. Cl.
| | |
|---|---|
| *D06F 37/20* | (2006.01) |
| *D06F 37/30* | (2020.01) |
| *H02K 5/00* | (2006.01) |
| *H02K 5/08* | (2006.01) |
| *H02K 5/15* | (2006.01) |
| *H02K 5/24* | (2006.01) |
| *D06F 37/22* | (2006.01) |
| *D06F 58/08* | (2006.01) |

(52) U.S. Cl.
CPC ............ *D06F 37/206* (2013.01); *D06F 37/30* (2013.01); *D06F 37/304* (2013.01); *H02K 5/00* (2013.01); *H02K 5/08* (2013.01); *H02K 5/15* (2013.01); *H02K 5/24* (2013.01); *D06F 37/22* (2013.01); *D06F 58/08* (2013.01)

(58) Field of Classification Search
CPC ...... D06F 37/206; D06F 37/30; D06F 37/304; D06F 58/08; H02K 5/00; H02K 5/08; H02K 5/15; H02K 5/24
See application file for complete search history.

(56) References Cited

U.S. PATENT DOCUMENTS

| | | | | |
|---|---|---|---|---|
| 5,049,770 | A | * | 9/1991 | Gaeth .................. F04D 23/008 |
| | | | | 310/43 |
| 5,872,414 | A | * | 2/1999 | Iijima .................. H02K 5/1672 |
| | | | | 310/43 |
| 2013/0043742 | A1 | * | 2/2013 | Jang ....................... H02K 3/522 |
| | | | | 310/43 |
| 2015/0123501 | A1 | * | 5/2015 | Jang .......................... H02K 5/08 |
| | | | | 310/43 |

(Continued)

FOREIGN PATENT DOCUMENTS

| | | |
|---|---|---|
| CN | 205039640 U | 2/2016 |
| CN | 206686006 U | 11/2017 |

(Continued)

OTHER PUBLICATIONS

Machine translation of CN 205039640 U to Li. (Year: 2016).*

*Primary Examiner* — Joseph L. Perrin
(74) *Attorney, Agent, or Firm* — Revolution IP, PLLC

(57) ABSTRACT

The motor for a washing machine includes a motor housing having a stator, a pair of first supports formed integrally with the motor housing in the front of the motor housing, a connection cylindrical member cylindrically extending backwardly from a middle part of the motor housing to be formed integrally with the motor housing, and a pair of second supports integrally formed at right and left ends of the connection cylindrical member.

4 Claims, 6 Drawing Sheets

(56) References Cited

U.S. PATENT DOCUMENTS

2016/0344250 A1* 11/2016 Jang ..................... H02K 5/08
2018/0258577 A1* 9/2018 Lee ..................... D06F 37/04
2020/0270798 A1* 8/2020 Lee ..................... F16F 1/376

FOREIGN PATENT DOCUMENTS

| EP | 0610717 A1 * | 8/1994 |
|----|---|---|
| KR | 10-2004-0100430 A | 12/2004 |
| KR | 10-1185121 B1 | 9/2012 |
| KR | 10-2016-0137009 A | 11/2016 |
| KR | 10-1707142 B1 | 2/2017 |

* cited by examiner

MOTOR FOR WASHING MACHINE

TECHNICAL FIELD

The present invention relates to a motor for a washing machine. More specifically, the present invention relates to a motor for a washing machine capable of shortening a motor assembling process and reducing the overall size of the motor to easily secure a space for installing the motor, by forming a motor housing in which a stator and a rotor are placed integrally with a fixing bracket by injection molding simultaneously.

BACKGROUND ART

In general, a washing machine includes a rotating drum of a cylindrical shape which contains laundry and a motor which is connected to a rotating shaft in the rear of the rotating drum with a belt to drive the rotating drum. The motor is fixed to the main body of a washing machine or drying machine. A housing or bracket for fixing the motor is made of aluminum or a bulk molding compound (BMC) resin.

In the case of using aluminum as in Korean Patent No. 10-1185121, noise or vibration occurs at the site of fixing the motor, and the material cost is high. Thus, recently a BMC resin has been used for motor housings and brackets. In the case of using a BMC resin, noise or vibration remarkably decreases, the material cost is saved, and the product is resistant to moisture.

A motor using a BMC resin is configured to stably drive a drum with a belt while being supported by a fixing bracket, by installing the fixing bracket inside the main body of the washing machine after the fixing bracket and the motor housing which are made of a BMC resin have been fastened to each other. This structure is disclosed in Korean Patent No. 10-1707142. According to said prior art reference, a motor is fixed to legs for supporting the motor by forming coupling holes through the lower surface of the motor housing, and fastening coupling bolts passing through fixing holes in the first and second legs to the coupling holes.

However, when the coupling bolts are fastened to the coupling holes having screw threads formed through the lower surface of the motor housing, cracks occur inside the coupling holes because the motor housing is made of a BMC material, and the fastening force decreases, disallowing the motor from retaining stable coupling. In addition, durability significantly decreases.

Further, the legs which are at least one or more are each coupled to the motor housing, which requires a complicate assembling process. Moreover, a reinforcement structure is not provided between the first and second legs, disallowing the motor from being stably coupled to the main body of a drying machine. In addition, the coupling bolts are screw-assembled while the fixing holes of the first and second legs match the coupling holes of the motor housing, and thus productivity is reduced because it is difficult to exactly match the fixing holes to the coupling holes.

Accordingly, the present inventors suggest a motor for a washing machine having a novel structure, in order to solve the above problems.

SUMMARY OF INVENTION

Technical Task

It is an object of the present invention to provide a motor for a washing machine of a novel structure which couples the motor stably and shortening a process for assembling a motor housing and a fixing bracket.

It is another object of the present invention to provide a motor for a washing machine of a novel structure providing enhanced reinforcement to a fixing bracket formed integrally with a motor housing.

The objects above and other objects inferred therein can be easily achieved by the present invention explained below.

Means for Solving Technical Task

The motor for a washing machine according to the present invention comprises a motor housing 11 comprising a stator 12; a pair of first supports 16 formed integrally with the motor housing 11 in the front of the motor housing 11; a connection cylindrical member 11B cylindrically extending backwardly from a middle part of the motor housing 11 to be formed integrally with the motor housing 11; and a pair of second supports 21 integrally formed at right and left ends of the connection cylindrical member 11B.

In the present invention, a curved guide 23 having a structure of integrally connecting upper parts of the second supports 21 may be formed integrally with the connection cylindrical member 11B.

In the present invention, a support reinforcer 24 having a plurality of hollows may be integrally formed downwardly of the curved guide 23.

In the present invention, a movement preventing support pad 25 being in surface-contact with a bottom surface of a main body of a washing machine may be integrally formed in a lower part of the support reinforcer 24.

In the present invention, a nonslip embossed part 25A may be formed in a lower surface of the movement preventing support pad 25.

In the present invention, a rear bearing cover 19 may be coupled to an insertion space 11B' in the connection cylindrical member 11B.

Effect of the Invention

The motor for a washing machine of the present invention has a novel structure forming a fixing bracket integrally with a motor housing in the front, capable of shortening a motor assembling process to increase productivity, thereby saving the cost incurred to manufacture the motor, and also providing a reinforcing force to the fixing bracket, thereby allowing the fixing bracket to be firmly fixed and supported inside a main body of a washing machine to prevent noise and vibration.

In addition, the present invention forms the rear fixing bracket integrally with the front motor housing at the back end thereof while a stator and a rotor are formed in the motor housing by insert injection molding, thereby making a compact motor and minimizing a space for installing the motor.

BRIEF OF DESCRIPTION OF THE DRAWINGS

Hereinafter, the present invention will be described in detail with reference to the accompanying drawings.

DETAILED DESCRIPTION FOR CARRYING OUT THE INVENTION

Figure 1:
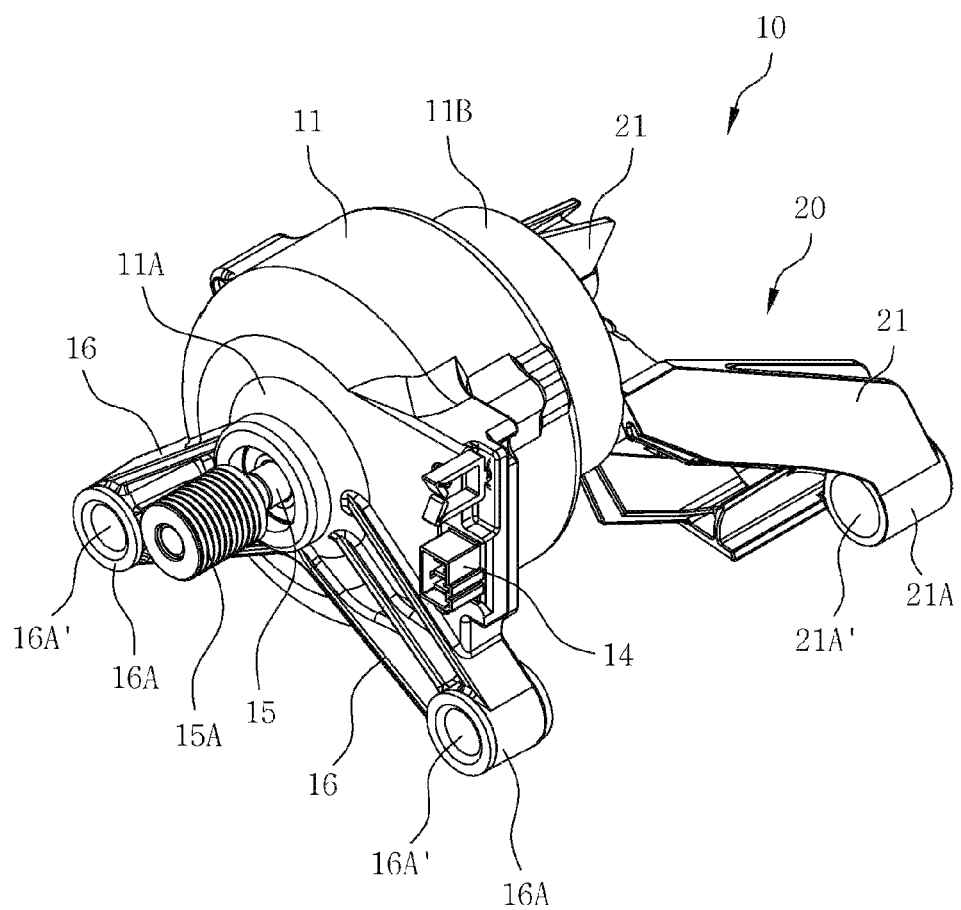
FIG. 1 is a front perspective view of a motor for a washing machine according to the present invention.
Figure 2:
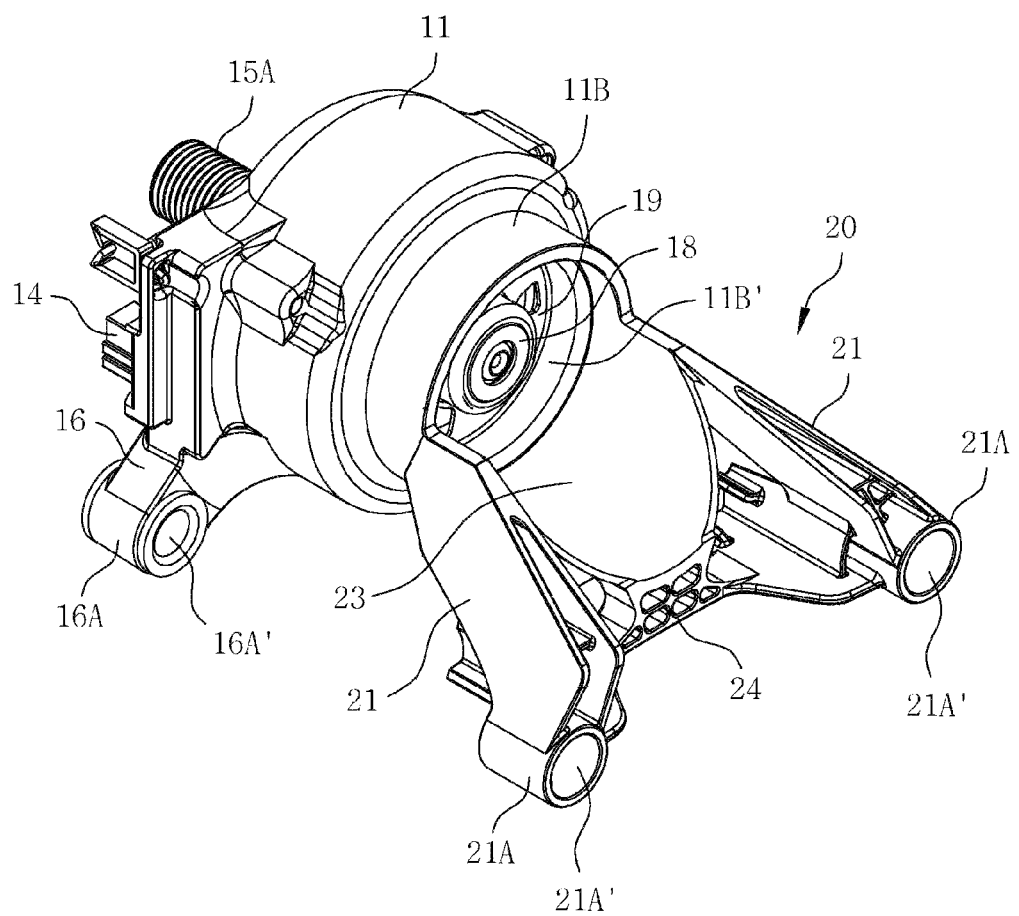
FIG. 2 is a rear perspective view of the motor for a washing machine according to the present invention.
Figure 3:
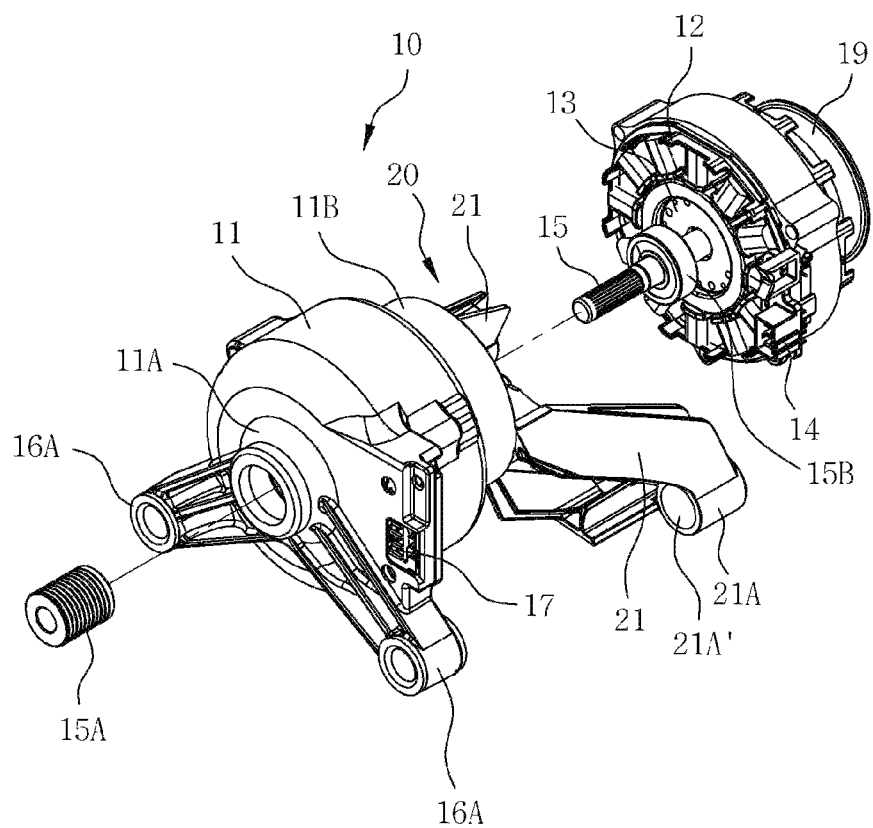
FIG. 3 is a front exploded perspective view of the motor for a washing machine according to the present invention.
Figure 4:
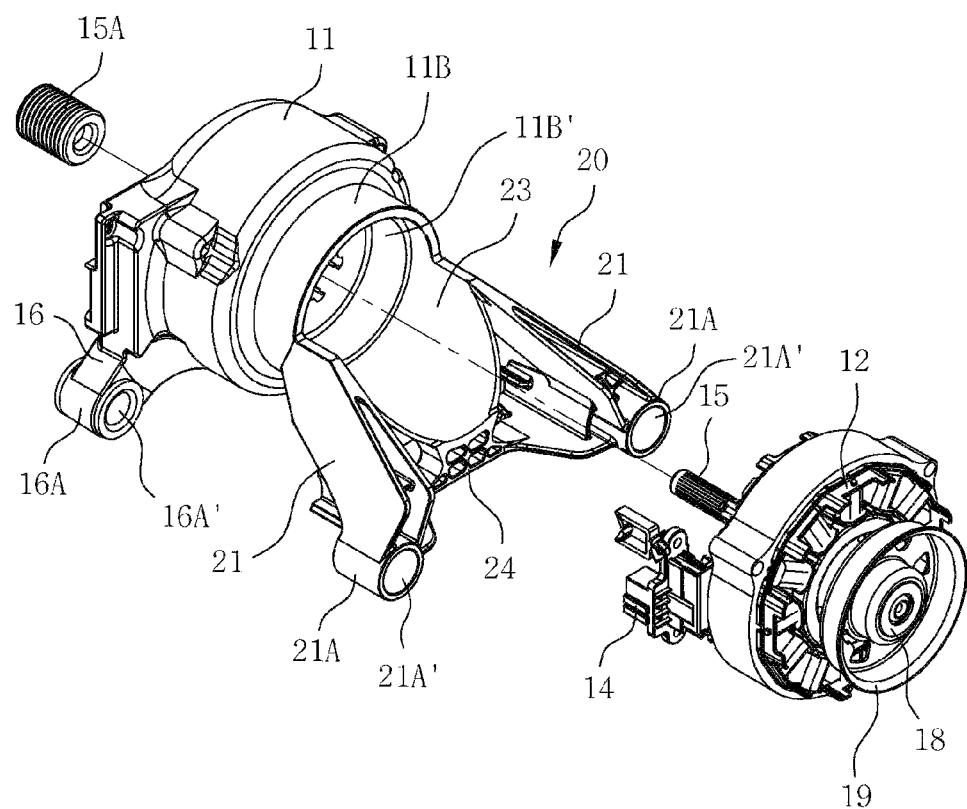
FIG. 4 is a rear exploded perspective view of the motor for a washing machine according to the present invention.
Figure 5:
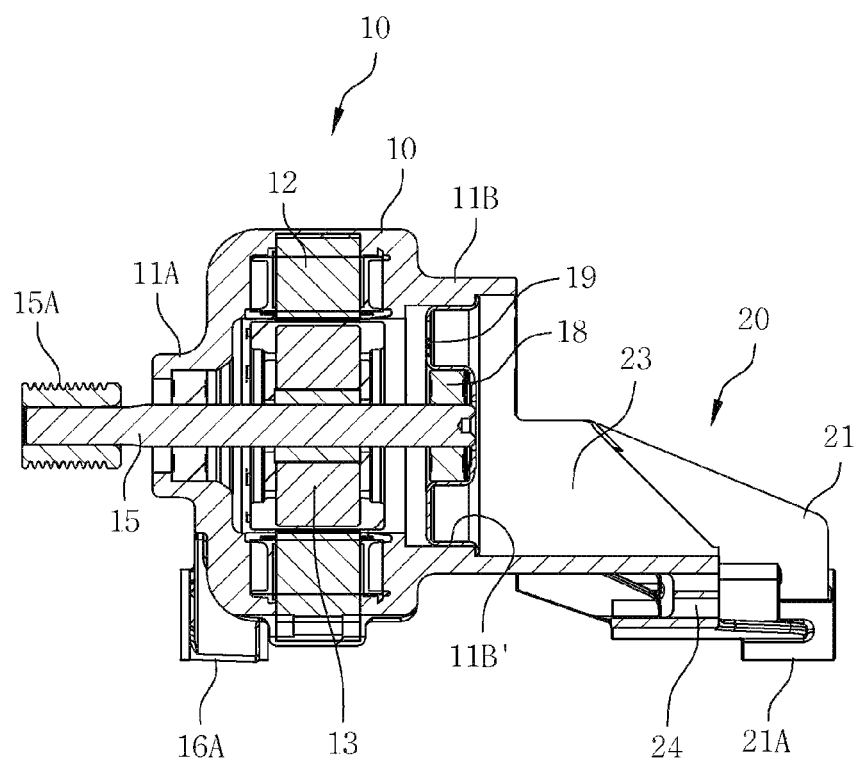
FIG. 5 is a cross-sectional view of the motor for a washing machine according to the present invention.

FIG. 1 is a front perspective view of a motor 10 for a washing machine according to the present invention. FIG. 2 is a rear perspective view of the motor 10 for a washing machine according to the present invention. FIG. 3 is a front exploded perspective view of the motor 10 for a washing machine according to the present invention. FIG. 4 is a rear exploded perspective view of the motor 10 for a washing machine according to the present invention. FIG. 5 is a cross-sectional view of the motor 10 for a washing machine according to the present invention.

The motor 10 according to the present invention is configured to stably rotate a rotating drum of a washing machine or a drying machine with a belt, etc., while the motor 10 is supported by a fixing bracket 20, by installing the fixing bracket 20 formed integrally with a motor housing 11 inside a main body (not shown) of a washing machine. As used herein, "a motor for a washing machine" is mainly described; however, the present invention is not necessarily limited to a motor for a washing machine but may be applied to a motor for a drying machine or a motor for other uses.

As illustrated in FIGS. 1 and 2, the motor 10 for a washing machine according to the present invention is provided by forming the motor housing 11 integrally with the fixing bracket 20 by injection molding.

The motor 10 according to the present invention is assembled without a process of assembling the fixing bracket 20, by simultaneously forming, by injection molding, the motor housing 11 which is made by disposing a stator 12 in an insert injection mold to be formed of a bulk molding compound (BMC) resin integrally with the fixing bracket 20 in the rear of the motor housing 11.

A power connector insert 14 installed at one side of the circumference in the front of the motor housing 11 comprising the stator 12 may be formed integrally with the motor housing 11 by injection molding.

Through a side slide mold between an upper mold and a lower mold, the front part of the motor housing 11 formed integrally with the fixing bracket 20 is disposed in the upper mold (not shown), the middle part of the motor housing 11 is disposed in the side slide mold (not shown), and the part of the fixing bracket 20 is disposed in the lower mold (not shown), to be integrally formed by injection molding at the same time.

As used herein, the "front part" of the motor housing 11 refers to the side of a power connector insert 14 and a pair of first supports 16 having a support cylindrical body 16A at the lower end, which are inclined downwardly from both sides of a front reinforcing cylindrical body 11A through which a rotating shaft 15 passes. The front part is disposed in the upper mold. A coupling hole 16A' is formed in the center of the support cylindrical body 16A. A power connector inserting hole 17 is formed inside the power connector insert 14.

As used herein, the "middle part" of the motor housing 11 refers to a part where the stator 12 is located. The middle part is formed by insert injection molding while being disposed in the side slide mold, and then the side slide mold is opened. Thereafter, the upper and lower molds are opened simultaneously, such that the fixing bracket 20 can be formed integrally with the motor housing 11 in the rear of the "middle part" of the motor housing 11 by injection molding at the same time.

A rotor 13 coupled to the rotating shaft 15 is inserted frontwardly from the rear of the stator 12 located in the motor housing 11 while the motor housing 11 comprising the stator 12 is formed by injection molding, and a drive pulley 15A is coupled to the front end of the rotating shaft 15 passing through the center of the reinforcing cylindrical body 11A. The drive pulley 15A is coupled to the front of the rotating shaft 15 and rotate together with the rotating shaft 15 to drive a drum (not shown) of a drying machine or a washing machine with a belt (not shown).

A front bearing 15B supports the rotation of the rotating shaft 15 in the front side of the rotating shaft 15. The front bearing 15B is coupled to the inside of the reinforcing cylindrical body 11A. FIGS. 3 and 4 illustrate the stator 12 separated from the motor housing 11, only for convenience in explanation. The stator 12 is not separated from the motor housing 11 in practice, because the motor housing 11 is formed by disposing the stator 12 in an insert injection mold.

A rear bearing 18 is coupled to the rear end of the rotating shaft 15, and the rear bearing 18 is coupled to a rear bearing cover 19. A connection cylindrical member 11B cylindrically extending backwardly from the middle part of the motor housing 11 is formed integrally with the motor housing 11. An insertion space 11B' for coupling the rear bearing cover 19 is formed in the connection cylindrical member 11B. The rotor 13 is inserted into the motor housing 11 through the insertion space 11B'.

A pair of second supports 21 formed integrally with the connection cylindrical member 11B at right and left lower ends are formed integrally with the motor housing 11. A curved guide 23 for assembling the rotating shaft and the rear bearing cover may be integrally formed in the center between one second support 21 and another second support 21. The front of the curved guide 23 may be formed integrally with the lower end of the connection cylindrical member 11B. A support cylindrical body 21A is formed at the lower end of the second support 21.

The rotor 13 coupled with the rotating shaft 15 may be inserted into the insertion space 11B' of the connection cylindrical member 11B while being guided through the curved guide 23, facilitating accurate and smooth assembling of the rotor 13 and the rear bearing cover 19 having a cylindrical shape. Further, when the rear bearing 18 in the rear bearing cover 19 is worn out, the bearing can be easily replaced and repaired.

A support reinforcer 24 having a plurality of hollows is integrally formed downwardly of the rotating shaft 15 and the curved guide 23, and both lower ends of the support reinforce 24 are connected and formed integrally with the support cylindrical bodies 21A of the pair of second supports 21. Accordingly, the second supports 21 are firmly supported, so as to not only withstand the load of the motor housing 11 which is a heavy weight containing the stator 12 and the rotor 13, but also be supported in balance with the first supports 16 in the front. Thus, the motor housing 11 does not incline in one direction, and the motor 10 can be installed stably.

The present invention forms the motor housing and the fixing bracket integrally by molding, using the connection cylindrical member 11B therebetween. Accordingly, the fixing bracket 20 may be formed in a short length without extending backwardly, capable of minimizing the size of the motor 10. In addition, the curved guide 23 may be open upwardly, which facilitates the inserting and disassembling of the rear bearing cover 19.

Figure 6:
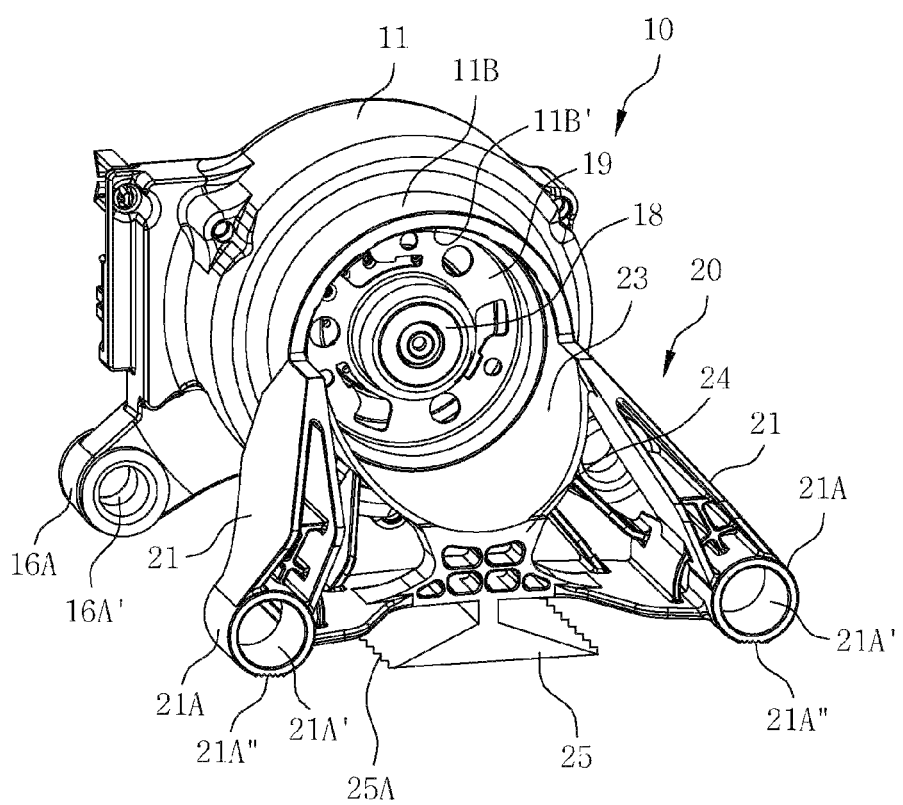
FIG. 6 is a rear perspective view of a motor for a washing machine according to another embodiment of the present invention.

FIG. 6 is a rear perspective view of a motor 10 for a washing machine according to another embodiment of the present invention. As illustrated in FIG. 6, the present invention inhibits back and forth and right and left movement of the motor 10 caused by vibration occurring upon operation of the motor 10, thereby preventing loosening of a coupling bolt (not shown) which is inserted into a coupling hole 16A' in a support cylindrical body 16A of a first support 16 and a coupling hole 21A' in a support cylindrical body 21A of a second support 21 and is screw-coupled to a main body of a washing machine, to respond to vibration of the motor and retain firm installation.

A movement preventing support pad 25 that is in surface-contact with the bottom surface of the main body of a washing machine is integrally formed in the vertical lower part of a support reinforce 24 below a curved guide 23, such that the lower surface of the support cylindrical body 21A of the second support 21 and the lower surface of the movement preventing support pad 25 are in surface-contact with the bottom surface of the main body of a washing machine. Accordingly, a force to move the motor 10 back and forth or right and left which may be generated when vibration occurs upon operation of the motor 10, may be inhibited. Thus, the motor 10 can be retained in more stable and firm installation.

In addition, nonslip embossed parts 21A", 25A are formed in the lower surface of the support cylindrical body 21A of the second support 21 and the lower surface of the movement preventing support pad 25, respectively, to prevent back and forth or right and left movement of the support cylindrical body 21A of the second support 21 and the movement preventing support pad 25 upon vibration of the motor 10.

The nonslip embossed part 21A" and the nonslip embossed part 25A may have embossings formed in the vertical or horizontal direction. Alternatively, the nonslip embossed part 21A" and the nonslip embossed 25A may have embossings formed in opposite directions.

The detailed description of the present invention described as above simply explains examples for understanding the present invention, but does not intend to limit the scope of the present invention. The scope of the present invention is defined by the accompanying claims. Additionally, it should be construed that simple modifications or changes of the present invention fall within the scope of the present invention.

What is claimed is:

1. A motor for a washing machine, comprising:
    a motor housing (11) comprising a stator (12);
    a pair of first supports (16) formed integrally with the motor housing (11) in the front of the motor housing (11);
    a connection cylindrical member (11B) cylindrically extending backwardly from a middle part of the motor housing (11) to be formed integrally with the motor housing (11);
    a pair of second supports (21) integrally formed at right and left ends of the connection cylindrical member (11B); and
    a curved guide (23) having a front portion integrally formed with a lower end of the connection cylindrical member (11B) and integrally connecting upper parts of the pair of second supports (21),
       the curved guide (23) being configured to guide insertion of a rotor (13) into an insertion space (11B') of the connection cylindrical member (11B),
    wherein a rear bearing cover (19) is coupled to an insertion space (11B') in the connection cylindrical member (11B).

2. The motor of claim 1, wherein a support reinforcer (24) having a plurality of hollows is integrally formed downwardly of the curved guide (23).

3. The motor of claim 2, wherein a movement preventing support pad (25) being in surface-contact with a bottom surface of a main body of a washing machine is integrally formed in a lower part of the support reinforcer (24).

4. The motor of claim 3, wherein a nonslip embossed part (25A) is formed in a lower surface of the movement preventing support pad (25).

* * * * *